United States Patent
Mickowski

(12) 
(10) Patent No.: US 6,357,334 B1
(45) Date of Patent: Mar. 19, 2002

(54) METHOD AND APPARATUS FOR THE CONTROL OF A DIE CASTING OR SIMILAR MACHINE

(75) Inventor: John R. Mickowski, Warwick, NY (US)

(73) Assignee: Tymac Controls Corporation, Franklin, NJ (US)

(*) Notice: Subject to any disclaimer, the term of this patent is extended or adjusted under 35 U.S.C. 154(b) by 0 days.

(21) Appl. No.: 09/386,554

(22) Filed: Aug. 31, 1999

(51) Int. Cl.[7] .......................... F15B 13/16; F15B 14/044
(52) U.S. Cl. ........................................... 91/364; 91/459
(58) Field of Search ..................... 91/361, 364, 365, 91/367, 459, 461; 164/151.1, 155.4

(56) References Cited

U.S. PATENT DOCUMENTS

| | | | | |
|---|---|---|---|---|
| 3,874,407 A | * | 4/1975 | Griswold | 91/459 X |
| 3,950,687 A | * | 4/1976 | Watson, Jr. | 91/363 A X |
| 4,031,813 A | * | 6/1977 | Walters et al. | 91/433 |
| 4,132,152 A | * | 1/1979 | Hunkar et al. | 91/364 |
| 4,133,250 A | * | 1/1979 | Heintz | 91/363 A |
| 4,164,167 A | * | 8/1979 | Imai et al. | 91/363 R |
| 4,202,247 A | * | 5/1980 | Hunkar et al. | 91/364 |
| 4,274,823 A | * | 6/1981 | Stanciu et al. | 425/145 |
| 4,334,216 A | * | 6/1982 | Lacroix | 91/363 A X |
| 4,345,638 A | * | 8/1982 | Hermes | 164/456 |
| 4,598,626 A | * | 7/1986 | Walters et al. | 91/433 |
| 4,612,489 A | * | 9/1986 | Gunda | 318/590 |
| 4,907,493 A | * | 3/1990 | Bellanger et al. | 91/364 X |
| 5,162,798 A | * | 11/1992 | Yundt | 341/116 |
| 5,240,041 A | * | 8/1993 | Garnjost | 137/625.62 |
| 5,271,389 A | * | 12/1993 | Isaza et al. | 128/204.21 |
| 5,305,681 A | * | 4/1994 | Devier et al. | 91/361 |
| 5,316,707 A | * | 5/1994 | Stanciu et al. | 425/135 X |
| 5,319,296 A | * | 6/1994 | Patel | 318/611 |
| 5,320,186 A | * | 6/1994 | Strosser et al. | 172/8 |
| 5,452,735 A | * | 9/1995 | Gamble et al. | 137/625.64 X |
| 5,519,678 A | * | 5/1996 | Park | 369/44.28 |
| 5,529,478 A | * | 6/1996 | Siegrist et al. | 425/150 |

* cited by examiner

*Primary Examiner*—John E. Ryznic
(74) *Attorney, Agent, or Firm*—Anderson Kill & Olick, P.C.; Eugene Lieberstein; Michael Meller

(57) ABSTRACT

An improved control system for die casting or similar machines wherein a closed loop velocity feedback circuit is supplemented with an integration circuit and two filtering circuits to compensate for the frequency response of the pilot valve in the die casting machine. The integration circuit serves to more accurately cause the velocity of an element being controlled to match the desired/commanded velocity, and also caused the velocity to more rapidly match the desired/commanded velocity.

20 Claims, 2 Drawing Sheets

METHOD AND APPARATUS FOR THE CONTROL OF A DIE CASTING OR SIMILAR MACHINE

TECHNICAL FIELD

This is invention relates to the control of a die casting machine, and in a preferred embodiment, to a method and apparatus for improving the adjustment of a velocity signal utilized to control the velocity of a moving piston in a die casting or similar machine.

BACKGROUND OF THE INVENTION

The automatic feedback closed loop control of a process describes a system whereby a process variable is measured and compared to a desired value to determine the error between them, the error is used to drive an adjustment of the process to return the process to the desired value. This system has been utilized in many applications for several decades. Human observation of a process and manual adjustment of the process to achieve the desired result is satisfactory in situations characterized by two basic elements: 1. The process varies slowly as compared to the time it takes to observe, determine the appropriate corrective action and make the adjustment, and 2. Human monitoring accuracy and the resolution of the adjustment means are both sufficient to result in precision adequate to maintain the process within desired tolerances. Examples of this in common use where the person regulates the speed of the process so as to meet the above criteria, are handwriting and driving an automobile. In contrast, consider the path of a bullet resulting from shooting a firearm. Here, the person has no control over the path of the bullet once fired. The person neither can observe the path of the bullet because the process involved varies too rapidly, nor is the persons' adjustment means during the process sufficient to maintain the accuracy of the bullet's path on its way to the target.

The prior art has developed numerous means to enhance the means of measurement and control in order to improve over human senses and limbs, for the purpose of improving the quality and/or productivity of processes of concern. The faster the process, the more challenging are the obstacles. However, the benefits are often enormous. Modern hard disk memory densities and data storage and acquisition times have made dramatic strides in recent years which would not have been possible without constant improvements in the automatic closed loop control systems which rapidly and accurately control the position of the read/write head over a track. When the action of a closed loop control system to detect an error and make the necessary correction occurs rapidly relative to the process time constant, it is considered a real time closed loop control system. Typically, this requires the corrective action to take place in a fraction of the process time constant.

A closed loop system with a response time near to or slower than the process time constant is not real time, and has limited ability to improve process consistency and accuracy over a system without closed loop control. This is fundamentally because if the time for a closed loop system to detect and measure a deviation and then take action to return the process to the desired value is about the same or longer than the time it takes for the process to vary significantly from the desired value, then the process will be allowed to vary too far before correction takes place. The consequence will be a process with excessive variation as compared to one with real time closed loop control. Indeed, if the delay in correction is too long, the corrections can come at a time in the process when the needed correction is the opposite of the actual correction, causing the process error to increase instead of decrease as intended.

Among various processes, achieving the necessary speed of response to realize real time control also increases in difficulty as the power involved in the processes increases. High pressure metal casting (die casting) is a process which has posed difficult obstacles to the implementation of real time closed loop control because the process entails hundreds to thousands of kilowatts in the process of forming metal parts. The time to fill the die cavity and form the part is commonly in the 20 to 70 millisecond range. This is obviously too short a time for a human to measure and correct the process of filling the cavity within the filling process itself. Real time closed loop control systems have only recently been applied to controlling the velocity of the plunger used in the die casting process to inject metal into the die, with any degree of success. Early systems often resulted in the out of phase corrections described earlier and failed to improve process consistency. Often, these earlier systems responded slower than open loop systems, and thus, represented a step backward.

As a result of the foregoing, the economic benefits and quality improvements promised by real time closed loop control have fallen short of the potential or actually made things worse due to the cost of the systems and additional downtime experienced. This is due to a number of causes. The high powers and need for response times in the range of 5 milliseconds or less have required the use of high performance electro-hydraulic servo valves which exhibit variation in their transfer function as system pressure, fluid viscosity, temperature and other factors vary. Consequently, a servo valve's output flow rates for a given input electrical signal vary not only with the above variables but also over time as they wear and/or become partially contaminated.

Prior systems for providing the electrical signal to the servo valve have used control means which measure the deviation from the desired value, and use proportional and sometimes also derivative control to generate the control signal to the servo valve. However, variations in the transfer function of the servo valve will inevitably allow a portion of the deviation to go uncorrected. For example, ideal servo valves would generate an exactly balanced flow and pressure output at each of the two output control ports in response to a zero voltage input signal, whereas real servo valves exhibit an imbalance (off-set) for a zero input. Off-sets result in velocity errors which degrade production quality and productivity. This offset is different for each valve. This alone would not pose an insurmountable problem, as such off-sets can be readily compensated for electronically. However, these off-sets vary with each of the factors listed previously. Several other variables can cause undesirable variation in the process. These include variations in temperature, hydraulic fluid viscosity, servo valve transfer function, main control valve response, hydraulic fluid supply pressure, and others.

FIG. 1 shows a block diagram of a conventional prior art system for controlling the velocity of a piston (i.e., a ram) in a die casting machine. The arrangement of FIG. 1 includes an error signal generator 101, summing circuit 102, several valves 103–104, and an operational amplifier 105. The transducer 106 may be any of a variety of commercially available off the shelf position transducers which output a voltage signal indicative of the position of, for example, a piston in a reciprocating device. The particular type of position transducer, whether it is based upon light beams, an LVDT, inductive sensors, proximity sensors, or magnetic hall effect sensors, is not critical to the present invention and many such transducers are well known and conventional in the art.

In operation, error generator 101 compares the command velocity to the actual velocity and outputs an error signal on line 108 indicative of the difference in velocity signal between the command and the actual velocity. The error signal is compared with the signal on line 109, indicative of the main valve's position, and an output signal representing the difference there between is conveyed on line 10. A conventional amplifier 105 then causes a pilot valve 103 to change the amount of hydraulic fluid that is forced against the main valve, thereby opening or closing the main valve to change the velocity of the piston within the die casting machine. The pilot valve controls the movement of the main valve and the main valve then controls the movement of the reciprocating piston. The use of a pilot valve to control the main valve as described is known in the art and will thus not be described in great detail herein.

In addition to the problems discussed above, several problems exist with the practical application of a system such as that shown in FIG. 1. First, the pilot valve 103 usually cannot keep up with the much more rapidly varying correction signal input on line 111. Additionally, the error signal and position signal 108 and 109 would ideally bring the error down to zero. However, in the practical world, this never occurs and there always exists some error signal which is required to offset some error in the fed back position signal.

Offset error and variations in transfer function of the pilot valve, main valve and amplifier 105 all require a non-zero signal to compensate, which results in an error between actual and command velocities. Similarly, variations in RAM friction and hydraulic system fluid pressure or viscosity will result in errors in actual velocity. Moreover, variations in these factors during production require regular and repeated calibration of the systems in order to maintain acceptable accuracy.

In view of the above, it can be appreciated that there exists a need in the art for an improved technique of accurately controlling the velocity of a reciprocating piston in a die casting or similar machine. Additionally, there exists a need in the art for insuring that a pilot valve and main valve may be accurately controlled in order to permit rapid adjustment of the velocity so that a piston follows the velocity profile previously set.

For purposes of explanation, a profile is a defined set of velocities along the stroke path that the piston is intended to follow. Such profiles are calculated and stored using empirical and/or mathematical techniques known to those in the art.

SUMMARY OF THE INVENTION

The above and other problems of the prior art are overcome in accordance with the present invention which relates to a technique for compensating for virtually all of the items which hinder the ability of the control circuit to cause the velocity of the reciprocating piston to follow a specified profile. In accordance with the invention, the velocity is not controlled by a difference signal generated by feeding back the actual velocity. Instead, the velocity is controlled by the integration of such difference signal, causing the main valve of the die casting machine to continue opening or closing as widely as necessary to in order to rapidly force the reciprocating piston to follow the desired velocity profile as indicated by a velocity command signal. Additionally, the control system is supplemented by a "clamp limit" circuit, which overrides the control system and limits the amount of opening that the valve is allowed to experience.

While the discussion that follows is directed largely to die casting machines, the invention has applicability among a variety of reciprocating machines that need to be controlled to follow a predetermined profile.

DETAILED DESCRIPTION OF THE PREFERRED EMBODIMENT

Figure 2:
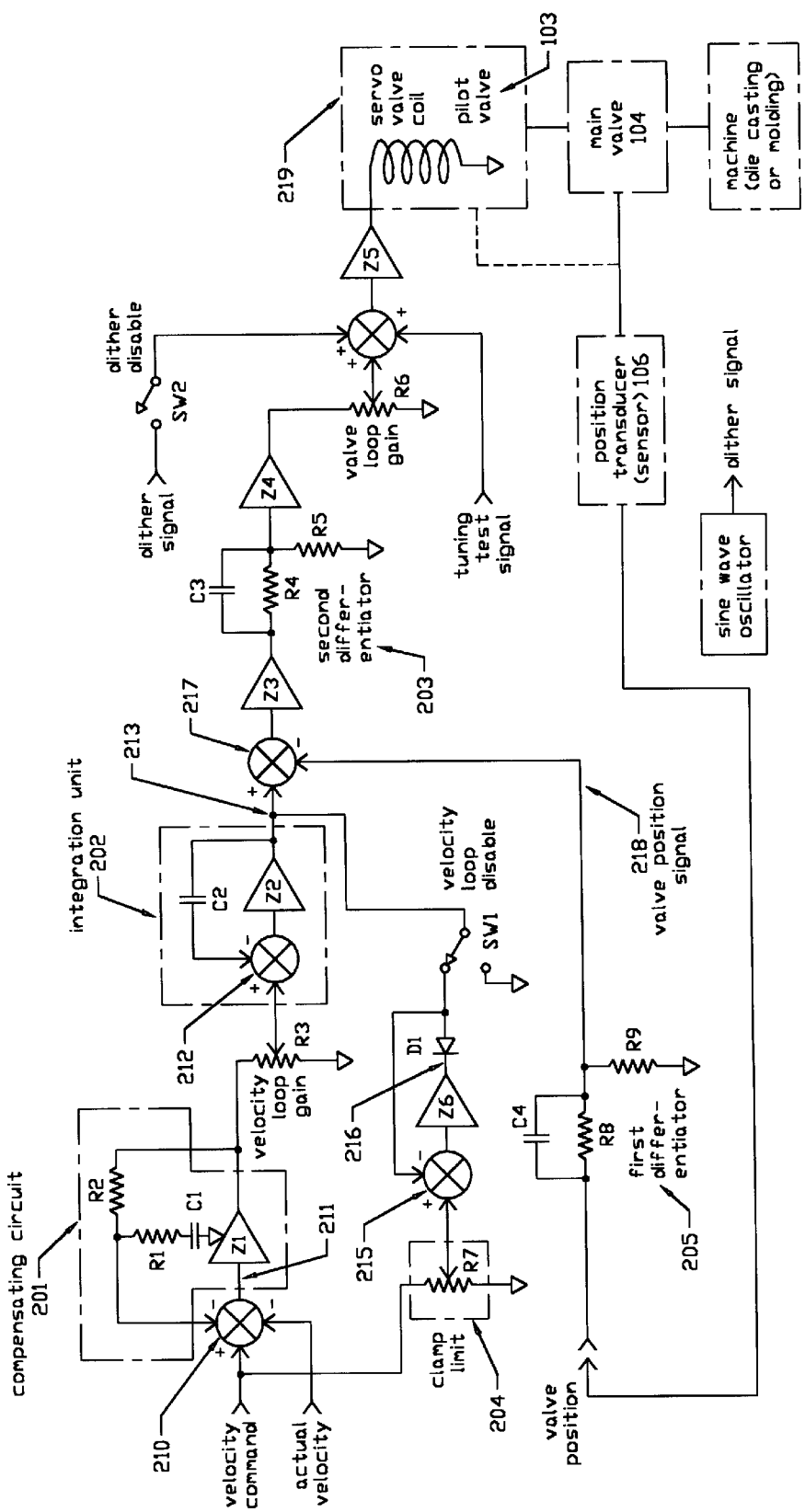
FIG. 2 is an exemplary circuit for implementing the present invention.

FIG. 2 is an exemplary circuit which implements the teachings of the present invention. The arrangement of FIG. 2 includes an error generation section 201 for comparing the actual and commanded velocities, and generating a difference signal there between. The other major functional sections include an integration unit 202, differentiating circuits 203 and 205, and a clamp limit circuit 204. The variety of remaining components shown in FIG. 2 will be described with respect to the details of each section of the arrangement of FIG. 2.

It is noted that the particular components used to construct the circuits are standard and available off the shelf. Thus, the details will not be described herein. Additionally, while the arrangement of FIG. 2 depicts analog components, much of the circuitry may be implemented with digital equivalents using analog-to-digital and digital to analog conversion devices, and digital signal processing algorithms. Those of skill in the art readily understand how to convert a specified analog system (e.g., a differentiator) into an equivalent system in the digital domain.

In operation, the arrangement of FIG. 2 serves as a closed loop control system for forcing a reciprocating ram in, for example, a die casting machine, to follow a commanded velocity profile as the ram traverses its stroke path. The closed loop nature means that any difference between the actual and desired velocity is fed back and utilized in order to correct for such error.

Comparator 210 generates an error signal 211 which is fed through amplifier Z1. Preferred values for R1, R2 and C1, are 82 Ohms, 21,500 Ohms, and 0.15 Microfarads, respectively. The combination of Z1 and its surrounding resistors and capacitors act as a compensation circuit, and compensates for the phase lag present within the injection cylinder itself, and caused by the time lag in the reciprocating piston responding to the control signal. More specifically, the frequency response of the piston is such that it begins to decrease at high frequencies. The compensation circuit 201 increases its response at high frequencies in order to compensate for the decreasing response of the piston. Thus, a substantially flat response is achieved. Another function is to decrease the phase lag of the circuit to prevent high frequency oscillation of Z1.

A variable gain integration unit is comprised of Z2. C2 and summer 212. A potentiometer R3, a typical value of which is 5000 ohms, is utilized to adjust the amplitude of the signal entering summer 212. Z2 and C2 comprise an integrator so that the signal present at point 213 consists of the integrated output of the velocity error signal. A typical value of C2 has been found to be 1,000 picofarads.

By integrating the velocity error signal, the valve controlling such velocity is forced to open or closed continuously and in an increasing or decreasing amount, respectively, until the error is corrected as much as possible. This results in more accurate control than was previously possible.

Clamp limit circuit 204 is intended to override the control system previously just discussed. Specifically, because the velocity error signal is being integrated, it is possible that the valve controlling such velocity may continue to open beyond what is acceptable. This could occur, for example, if there is a problem in the die casting machine itself which is hindering the movement of the ram. The control system previously described would otherwise continue to open the valve attempting to force the piston forward, resulting in a potential accident, if the hindrance suddenly ceased.

Figure 1:
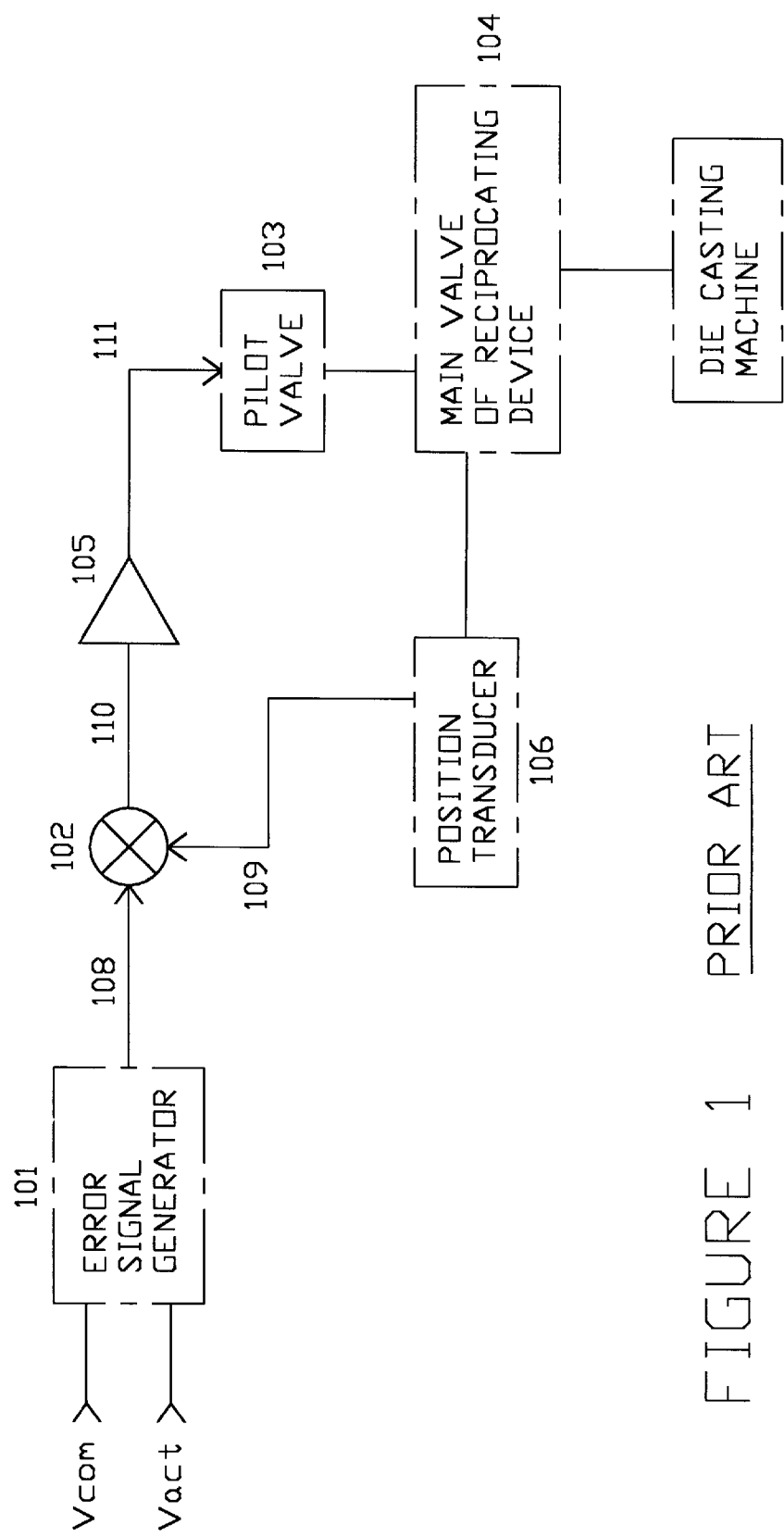
FIG. 1 is a conventional prior art closed loop control system for a die casting or similar machine with a reciprocating device.

In order to avoid the foregoing problem, a clamp limit circuit 204 is installed. The clamp limit circuit is comprised of a potentiometer R7, a typical value of which is 5000 ohms. A summing circuit 215, amplifier Z6, diode D1 and an enabling switch SW1 are also included as shown. The potentiometer R7 is set to a desired value which corresponds to the maximum allowable opening in the main valve of the die casting machine, such as that shown as 104 in FIG. 1. If the voltage output at Z2 on point 213 becomes higher than the predetermined clamp limit voltage at point 216, the diode D1 will turn on and hold the voltage at point 213 down to the same voltage as present at point 216, plus an additional small amount of approximately 0.7 volts to account for the drop across diode D1.

Thus, with the clamp limit circuit 204, the voltage at point 213 can never go higher than the voltage at point 216 plus 0.7, thereby limiting the amount of voltage input into comparator 217. More specifically, the action of amplifier Z6 and summing circuit 215 is to limit the voltage at point 213 to the voltage at the arm of potentiometer R7. R7 is connected to velocity command so that the maximum allowed opening of the main valve is increased or decreased at higher or lower command velocities, respectively.

Turning to the portion of the circuit in FIG. 2 that is to the right of amplifier Z2, a valve position input 218 is compared with the integrated error signal at point 213, and the output of such comparison amplified for use in control of the servo valve coil 219.

The circuitry enclosed as 203 and that of 205 are each two different differentiators. The purpose of differentiators 205 and 203 is best understood by returning to the prior art arrangement of FIG. 1. The velocity of the die casting is controlled by forcing hydraulic fluid through main valve 104. The pilot valve 103 opens and closes in order to allow hydraulic fluid to open and close the main valve 104. In conventional prior art systems, a problem with control of the pilot valve arises due to the inability of the pilot valve to follow a rapidly varying signal input on line 111 in FIG. 1. Specifically, if the velocity signal being input on line 111 varies quickly, the pilot valve will have a low response at such rapidly varying frequencies, and will not respond with an appropriate amplitude, thereby losing most of the control signal intended.

In order to compensate for the foregoing problem, the purpose of differentiators 203 and 205 is to provide signals which increase in amplitude in order to compensate for the decreased frequency response of the pilot valve. Put another way, the pilot valve's frequency response can be plotted, and the combined frequency response of 205 and 203 is the inverse, thereby offsetting the frequency response of the pilot valve output and resulting in a pilot valve which has a flat frequency response across all relevant frequencies.

For example, turning to differentiator 205, C4 is an open circuit at low frequencies, and thus, 205 acts solely as a voltage divider (i.e. a constant multiplier), at low frequencies. At higher frequencies, when the pilot valve will have a lower amplitude response, C4 acts more like a short circuit, thereby increasing the voltage on line 218 and causing a larger amplitude signal to be input into the pilot valve to compensate for its lower amplitude frequency response. Since the pilot valve acts approximately as a second order lag, the two stages 203 and 205, each of which acts as a first order lead at approximately the same characteristic frequency as the pilot valve are required in order to implement the appropriate response. Exemplary values of the elements utilized at 203 and 205 include 0.022 microfarads, 57,600 ohms, 1,100 ohms, 0.075 microfarads, 250,000 ohms, and 1,100 ohms for C4, R8, R9, C3, R4, and R5, respectively. Each differentiater also incorporates a lag to remove undesirable noise at high frequencies.

It has been shown that by integrating the velocity error signal and including two differentiators to offset the frequency response of the pilot valve, an improved system is achieved. Additionally, by including a compensation circuit comprised of R1, R2 and C1 within the system, the phase lag of the die casting piston is accounted for, resulting in improved (i.e. faster) response of the closed loop. While the foregoing describes the preferred embodiment of the invention, various modifications or additions will be apparent to those of skill of the art. These modifications and additions are intended to be covered by the following claims.

What is claimed:

1. A method of controlling a reciprocating apparatus, said method comprising the steps of:
   measuring a parameter of the reciprocating apparatus that is desired to be controlled,
   comparing said measured parameter to a desired value of said parameter to generate an error signal;
   integrating said error signal, and
   utilizing said integrated error signal to adjust said parameter.

2. The method of claim 1 wherein said parameter is a velocity associated with a moving piston inside a die casting machine or other machine having a reciprocating ram.

3. The method of claim 2 wherein said step of utilizing comprises the step of controlling a pilot valve in a die casting machine or other machine having a reciprocating ram.

4. The method of claim 3 wherein said pilot valve has a frequency response and wherein said step of comparing further comprises the step of filtering said error signal in a manner to compensate for said frequency response of said pilot valve.

5. The method of claim 3 wherein said step of controlling the pilot valve includes the step of limiting said control with a clamp circuit that overrides the step of controlling and limits said pilot valve to a specified opening, said specified opening being dependant upon said desired parameter value, said parameter being velocity.

6. The method of claim 3 further comprising the step of subtracting from said integrated error signal a signal indicative of a position of said pilot valve in order to generate a first difference signal.

7. The method of claim 6 further comprising the step of differentiating the first difference signal.

8. The method of claim 7 wherein said signal indicative of said pilot valve is twice differentiated.

9. Apparatus for controlling a velocity of a reciprocating piston comprising:

means for comparing a desired velocity to the actual velocity to be controlled and for generating an error signal in response to said comparison;

means for integrating the error signal; and means for employing the integrated error signal to control and adjust said actual velocity.

10. The apparatus of claim 9 further comprising a compensation circuit for providing correction in response to a frequency response exhibited by said reciprocating piston.

11. The apparatus of claim 9 wherein said means for employing includes a pilot valve.

12. The apparatus of claim 11 further comprising a compensation circuit for compensating for phase lag of said pilot valve.

13. The apparatus of claim 9 comprising a clamp circuit which overrides and prevents any correction caused by said integrated error signal beyond a specified value.

14. The apparatus of claim 11 wherein said pilot valve controls the fluid flow to a main valve.

15. Apparatus for controlling a die casting machine comprising:

a velocity transducer for measuring the velocity of a reciprocating piston in said die casting machine;

a comparator for comparing said velocity to a specified velocity profile, and for generating a difference signal in response to said comparison; and means for integrating said difference signal, and for combining said integrated difference signal with a signal indicative of a position of a valve.

16. Apparatus of claim 15 wherein said signal indicative of a position of said valve is filtered through a filter, said filter operating in a manner such that it corrects for phase lag of said valve.

17. Apparatus of claim 16 wherein said valve comprises both a pilot valve and a main valve.

18. Apparatus for controlling a machine comprising:

means for measuring velocity of a reciprocating piston;

means for generating an error signal between said measured velocity and a predetermined velocity; and means for integrating said error signal, and for inputting said integrated error signal as a control signal to a pilot valve.

19. The apparatus of claim 18 wherein said machine is a die casting machine.

20. The apparatus of claim 18 wherein said machine is a molding machine.

* * * * *